United States Patent
Fujii et al.

(10) Patent No.: US 9,499,070 B2
(45) Date of Patent: Nov. 22, 2016

(54) STRIKER FOR USE WITH VEHICLE

(71) Applicant: TACHI-S CO., LTD., Tokyo (JP)

(72) Inventors: Hiroyuki Fujii, Tokyo (JP); Toshinari Mitsumoto, Tokyo (JP)

(73) Assignee: TACHI-S CO., LTD. (JP)

( * ) Notice: Subject to any disclaimer, the term of this patent is extended or adjusted under 35 U.S.C. 154(b) by 199 days.

(21) Appl. No.: 14/319,774

(22) Filed: Jun. 30, 2014

(65) Prior Publication Data

US 2015/0014999 A1 Jan. 15, 2015

(30) Foreign Application Priority Data

Jul. 12, 2013 (JP) .................................. 2013-146371

(51) Int. Cl.

| | |
|---|---|
| E05B 15/02 | (2006.01) |
| B60N 2/015 | (2006.01) |
| E05B 85/04 | (2014.01) |
| B60N 2/36 | (2006.01) |
| E05B 15/00 | (2006.01) |

(52) U.S. Cl.
CPC ........... B60N 2/01583 (2013.01); B60N 2/366 (2013.01); E05B 85/04 (2013.01); E05B 85/045 (2013.01); B60N 2205/20 (2013.01); Y10T 292/0908 (2015.04)

(58) Field of Classification Search
CPC .............................. E05B 85/04; E05B 85/045
USPC ........................ 292/340, 341, 341.11–341.14
See application file for complete search history.

(56) References Cited

U.S. PATENT DOCUMENTS

| | | | | |
|---|---|---|---|---|
| 1,690,408 | A * | 11/1928 | Hasenflue | ............... E05C 19/08 29/437 |
| 6,000,737 | A * | 12/1999 | Yiu | ....................... E05B 85/045 292/340 |
| 6,692,046 | B2 * | 2/2004 | Paskonis | ................. E05B 77/10 29/410 |
| 7,097,219 | B2 * | 8/2006 | Paskonis | ............... E05B 85/045 292/340 |
| 2009/0212579 | A1 * | 8/2009 | Hemingway | ......... E05B 85/045 292/341.12 |

FOREIGN PATENT DOCUMENTS

| | | | | |
|---|---|---|---|---|
| DE | EP 1134334 A1 * | 9/2001 | ........... | E05B 85/045 |
| DE | 102005034098 A1 * | 1/2007 | ............ | B60R 21/38 |
| EP | 410864 * | 1/1991 | | |
| JP | 10-44847 | 2/1998 | | |
| JP | 2001003610 * | 1/2001 | | |
| JP | 2011-201453 | 10/2011 | | |

* cited by examiner

*Primary Examiner* — Carlos Lugo
(74) *Attorney, Agent, or Firm* — Ostrolenk Faber LLP

(57) ABSTRACT

A striker for use with a vehicle having a lock element, which comprises an engagement portion engageable with the lock element and a reinforcing bracket disposed relative to the engagement portion of the striker, such that a predetermined space is provided between the reinforcing bracket and engagement portion. When a relatively small load is applied via the lock element to the engagement portion, an impact energy of the load to body side of the vehicle is absorbed by the striker in a period of time during which the engagement portion is deformed within the predetermined space. If the load is great, the engagement portion is deformed over that space and contacts the reinforcing bracket, thereby being prevented against further deformation, such that an impact energy of the great load to the body side of vehicle is absorbed and reduced in the striker and reinforcing bracket in a stepwise way.

8 Claims, 4 Drawing Sheets

STRIKER FOR USE WITH VEHICLE

BACKGROUND OF THE INVENTION

1. Field of the Invention

The present invention relates to a striker for use with a vehicle having a lock element provided therein. For example, the striker may be fixed on a body side of the vehicle, and the lock element (i.e. latch) be provided in a seat of the vehicle, so that the lock element is engageable with the striker for locking the seat at a predetermined position. In particular, the invention is directed to a reinforcing arrangement to minimize damage of the striker and body side of the vehicle when a relatively small or great load is applied thereto via the lock element from the seat.

2. Description of Prior Art

Conventionally, in a vehicle including an automobile or the like, a striker is provided to a body or body side of the vehicle at a predetermined locking position, whereas on the other hand, a lock element capable of engagement with the striker is provided to a seat in the vehicle, so that the seat can be locked at the predetermined position by engagement of the lock element with the striker.

With regard to such engagement of the lock element with the striker, there is known a displacement restriction element for restricting displacement of the lock element relative to the striker. For example, Japanese Laid-Open Patent Publication No. 10-44847 (JP 10-44847 A) discloses a displacement restriction element of this kind, which is a bracket fixedly provided to the seat in the vicinity of the lock element. According thereto, during engagement of the lock element with the striker, even when a great load is applied to the seat in any direction, which causes displacement of the lock element relative to the striker, the lock element comes to contact with one of the end portions of the bracket, thereby restricting displacement of the lock element relative to the striker in any of forward and rearward directions as well as in any of rightwise and leftwise directions.

Also, known is a dislocation preventive element for preventing dislocation of the lock element from a tolerable given position with respect to the striker. This is for example disclosed from Japanese Laid-Open Patent Publication No. 2011-201453 (JP 2011-201453 A) which shows a dislocation preventive element provided adjacent to and alongside of the striker fixed on a floor side of vehicle. When a great load is applied to the seat, the lock element engaged with the striker is brought to contact with the dislocation preventive element, thereby preventing the lock element from being dislocated from a tolerable given position with respect to the striker.

The above prior arts permit a reliable engagement of the lock element with the striker and also insure to maintain a stable locking relation between the lock element and the striker. However, they only provide a reinforcement to the lock element on the side of seat, but do not teach any means for sufficient reinforcement to the striker on the vehicle body side. In other words, in each of the prior arts, upon a great load applied to the seat in either of forward-and-rearward and leftwise-and-rightwise directions, the great load will be transmitted through the lock element directly to the striker, with the result that the striker will be deformed. In order to avoid such deformation of the striker, a bracket may be coupled with the striker integrally for reinforcement of the striker sufficient to withstand the great load. But, in that case, even a load lower than the great load, normally applied to the seat, will be imparted via both bracket and striker to a body side of vehicle. Namely, such relatively low load will be directly exerted upon a connecting area to which the bracket and striker are fixedly connected in the vehicle body. As a result thereof, it is possible that both vehicle body and striker as well as such connecting area will be deformed or broken even by that relatively low load. This possibility will be quite high in the case where the vehicle body is weak or low in rigidity.

SUMMARY OF THE INVENTION

In view of the afore-stated drawbacks, it is a purpose of the present invention to provide a striker for with a vehicle, with which a lock element is to be engaged, the striker including a reinforcing bracket and being so arranged with the reinforcing bracket as to reduce a load applied from a seat in the vehicle to the striker via the lock element, thereby decreasing a corresponding impact energy to the striker and a body side of the vehicle.

In order to achieve such purpose, in accordance with the present invention, there is provided a striker for use with a vehicle having a lock element provided therein, which basically comprises:

an engagement portion with which said lock element is to be engaged; and a reinforcing bracket disposed with respect to the engagement portion, such that a predetermined space is provided between the reinforcing bracket and the engagement portion, wherein, when the lock element is engaged with the engagement portion of the striker and when a load is applied via the lock element to the engagement portion by an excessive great degree, causing deformation and displacement of the engagement portion over the predetermined space, the engagement portion comes to contact with the reinforcing bracket, thereby limiting the displacement of the engagement portion.

For example, the engagement portion may be formed in a substantially rod shape so as to extend in a direction that intersects a direction in which the lock element extends, when the lock element is engaged with the engagement portion.

As one aspect of the present invention, the engagement portion may be formed in a substantially rod shape so as to extend in a first direction that intersects a second direction in which the lock element extends, when the lock element is engaged with the engagement portion, and the predetermined space be elongated in a direction along the second direction of the lock element in relation to the engagement portion.

As another aspect of the present invention, the engagement portion may be formed in a substantially rod shape so as to extend in a direction that intersects a direction in which the lock element extends, when the lock element is engaged with the engagement portion, and the predetermined space may include: a pair of first and second space areas substantially defined on first opposite sides of the engagement portion, such that both pair of first and second space areas open in a first direction that intersects the engagement portion and the lock element engaged with that engagement portion; and a pair of third and fourth space areas substantially defined on second opposite sides of said engagement portion, such that both pair of third and fourth space areas open in a second direction that intersects the first direction of the pair of first and second space areas, and also open along a direction in which the lock element extends.

With respect to the foregoing another aspect of the invention, the pair of third and forth space areas may each be elongated in said second direction in relation to the engagement portion. Also, the pair of first and second space areas may be smaller than the pair of third and fourth space areas, respectively.

Preferably, the striker may be so formed from a rod material as to have a loop portion of a substantially "U" shape, the loop portion including a first substantially-rectilinear region and a second substantially-rectilinear region, such that the first and second substantially-rectilinear regions extend in a substantially parallel relation with each other and also extend in a first direction that intersects a second direction in which the lock element extends. In that mode, the afore-said engagement portion may be one of the first and second substantially-rectilinear regions of said loop portion.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated one exemplary mode of striker and reinforcing bracket in accordance with the present invention. A description will be made thereof, as applied to a vehicle or automotive seat for instance.

Figure 1:
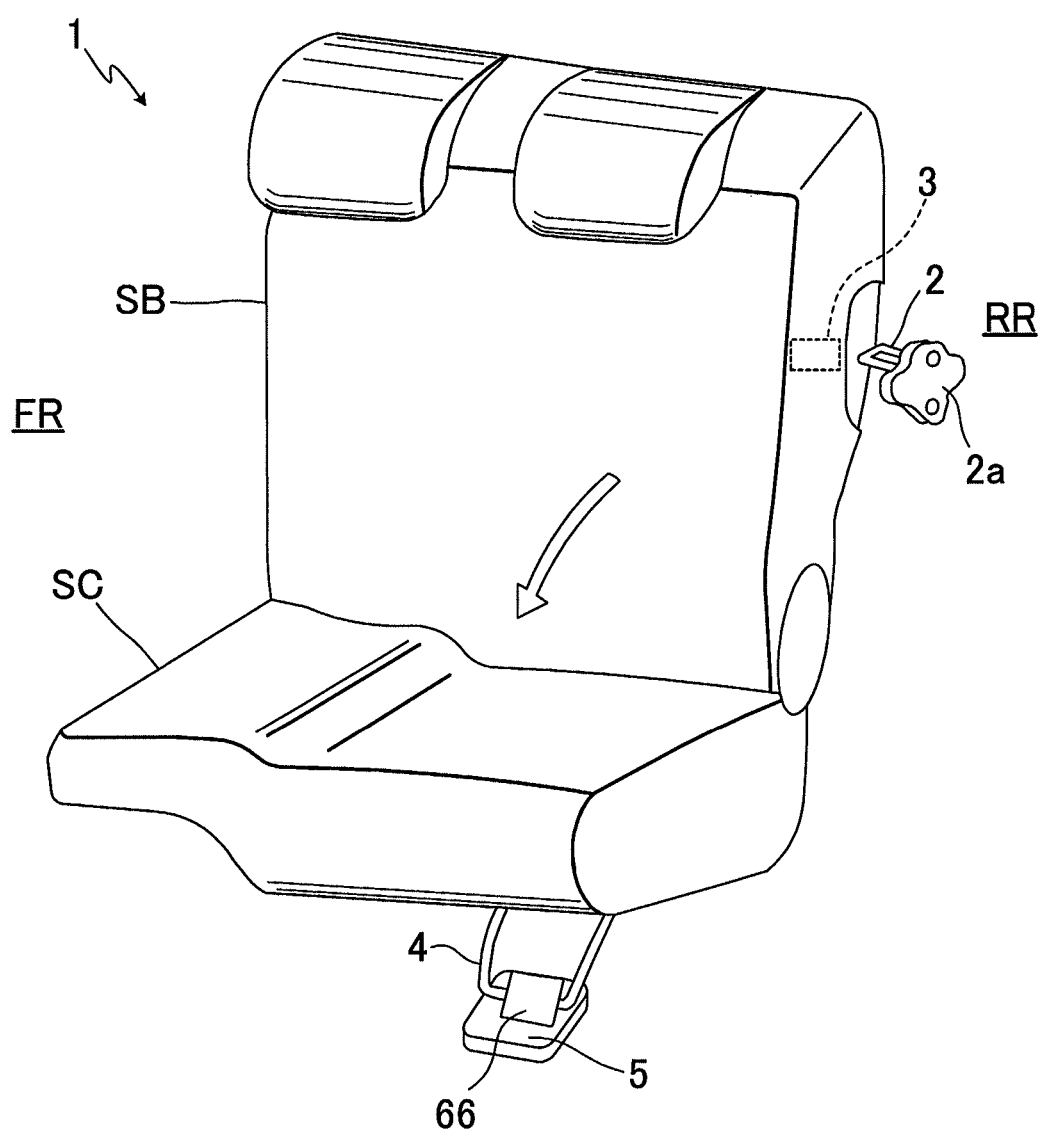
FIG. 1 is a perspective view of a vehicle seat to which a principal part of the present invention is applied.
Figure 2:
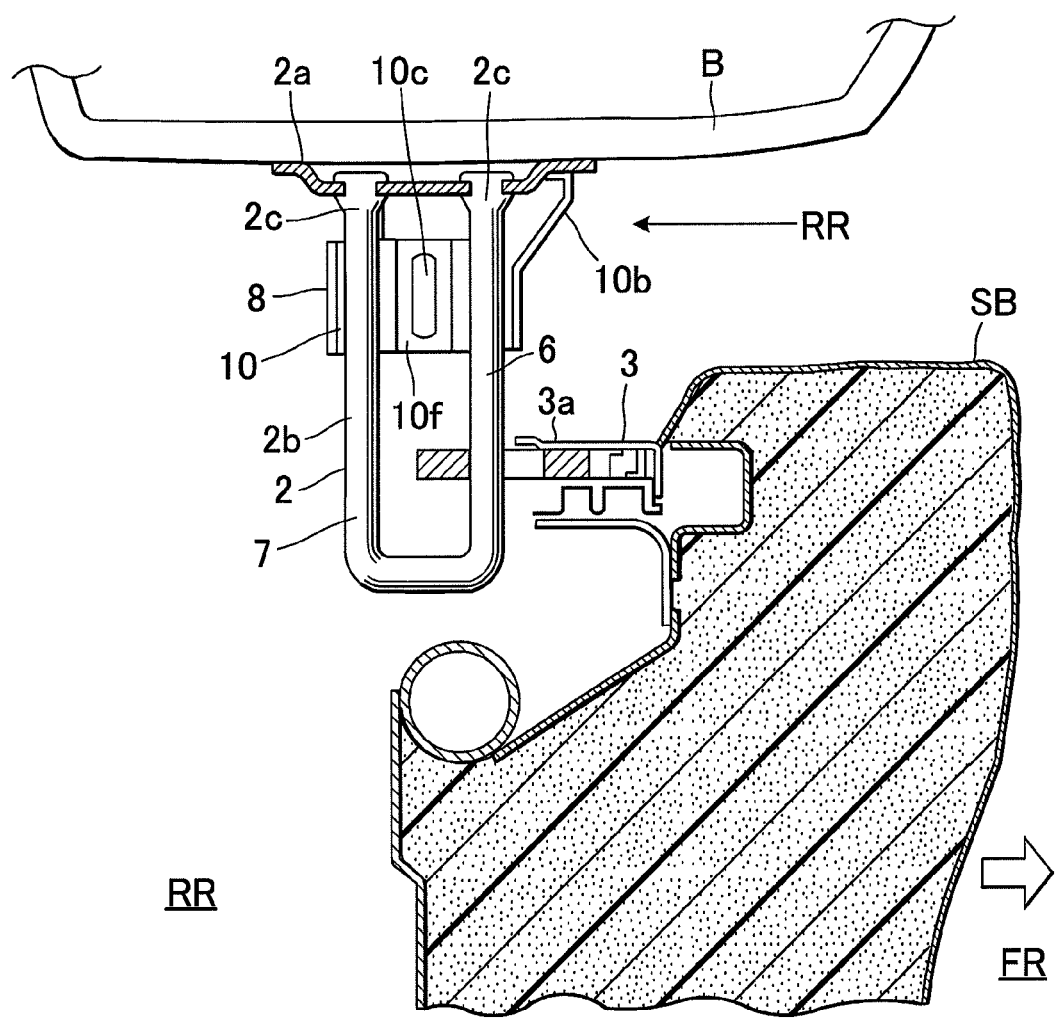
FIG. 2 is a fragmentary sectional view showing one exemplary mode of the principal part (striker and reinforcing bracket) as applied to the vehicle seat and a vehicle body side, as viewed from above.

In FIG. 1, the automotive seat is designated by 1, which comprises a seat cushion SC and seat back SB. The seat back SB is foldable forwardly and downwardly onto the seat cushion SC. As seen in FIGS. 1 and 2, a lock element 3 is provided in one lateral portion of the seat back SB, whereas a striker 2 is fixed to a vehicle wall B which is a part of unshown vehicle body. The lock element 3 is engageable with and disengageable from the striker 2, as known in the art. Normally, the seat back SB is locked in an upright use position, as in FIG. 1, due to the lock element 3 being engaged with the striker 2. Effecting an unlocking action to disengage the lock element 3 from the striker 2 permits the seat back SB to be folded forwardly and downwardly as indicated by the arrow in FIG. 1 or the arrow in FIG. 2.

The seat cushion SC has a front support leg member 4 pivotally connected by a hinge 66 to a floor portion 5 of vehicle. Thus, after having folded the seat back SB onto the seat cushion SC, it is possible to rotate both seat cushion SC and seat back SB forwardly relative to the hinge 66 toward an upright storage position. But, this is not the subject matter of the present invention and any further description thereof is omitted.

The lock element 3 itself is formed to have a known construction including a latch 3a movable for engagement with and disengagement from the striker 2. Normally, as seen in FIG. 2, the latch 3a is engaged with the striker 2, so that the seat back SB is locked at a predetermined position at the vehicle wall B which is a part of vehicle body.

It is noted that the wording, "forward", "forwardly" and "front", refer to a direction toward a forward side FR of the seat 1, whereas the wording, "rearward", "rearwardly" and "rear", refer to a direction toward a rearward side RR of the seat 1.

In accordance with the present invention, the striker 2 comprises: a securing base member 2a adapted for mounting on the vehicle wall B; a loop portion 2b extending in a direction from that securing base member 2a toward a side where the seat back SB exists, wherein the loop portion 2b which forms a female engagement portion with which the latch 3a or male engagement piece can be engaged; and a reinforcing bracket 8. The loop portion 2b is formed by bending a rod in a substantially "U" shape and has a pair of free end portions 2c and 2c which are fixedly connected to the securing base member 2a. As shown, the securing base member 2a is firmly attached to the vehicle wall B by means of securing screws S.

The substantially "U" shaped loop portion 2b of the striker 2 includes a front rectilinear region 6 and a rear rectilinear region 7, as shown. Such loop portion 2b per se extends horizontally from (perpendicularly to) a vertically extending surface of the vehicle wall B in a direction to the seat back SB. Therefore, the front rectilinear region 6 of the loop portion 2b extends horizontally toward the seat back SB on the forward side FR of the seat 1, whereas the rear rectilinear region 7 thereof extends horizontally toward the seat back SB on the rearward side RR of the seat 1. The front rectilinear region 6 is a lock point where the latch 3a of the lock element 3 may be engaged with that front rectilinear region 6 for the purpose of locking the seat back SB at a predetermined position. As observed in FIG. 2, the latch 3a projects rearwardly from the seat back SB, thus extending along the forward-and-rearward direction of the seat 1, which corresponds to a forward-and-rearward direction in which the seat back SB is to be rotatively displaced relative to a pivotal connection point where the seat back SB is pivotally connected with the seat cushion SC. Therefore, the loop portion 2b of the striker 2 is situated at a location where it extends orthogonally to such forward-and-rearward direction in which the seat back SB or the latch 3a is to be rotatively displaced. Hence, when the seat back SB is moved upwardly and rearwardly relative to the afore-said pivotal connection point towards the upright use position thereof, the latch 3a is also moved upwardly and rearwardly in a direction orthogonal to the horizontally extending loop portion 2b of the striker 2 and eventually engaged with the front rectilinear region 6 thereof. Under such engaged state, the latch 3a extends forwardly and rearwardly in a direction orthogonal to the front rectilinear region 6 of the loop portion 2b.

Figure 3:
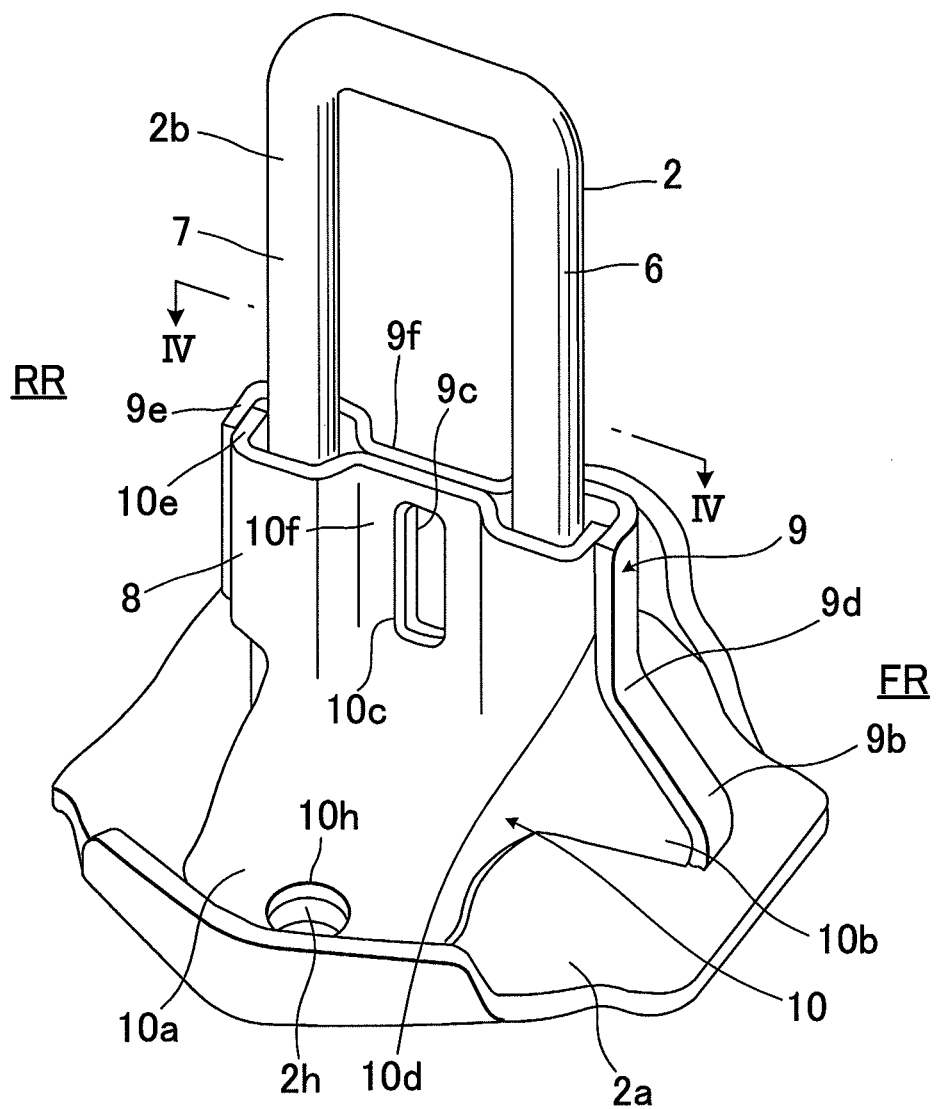
FIG. 3 is a perspective view showing the striker and reinforcing bracket.
Figure 4:
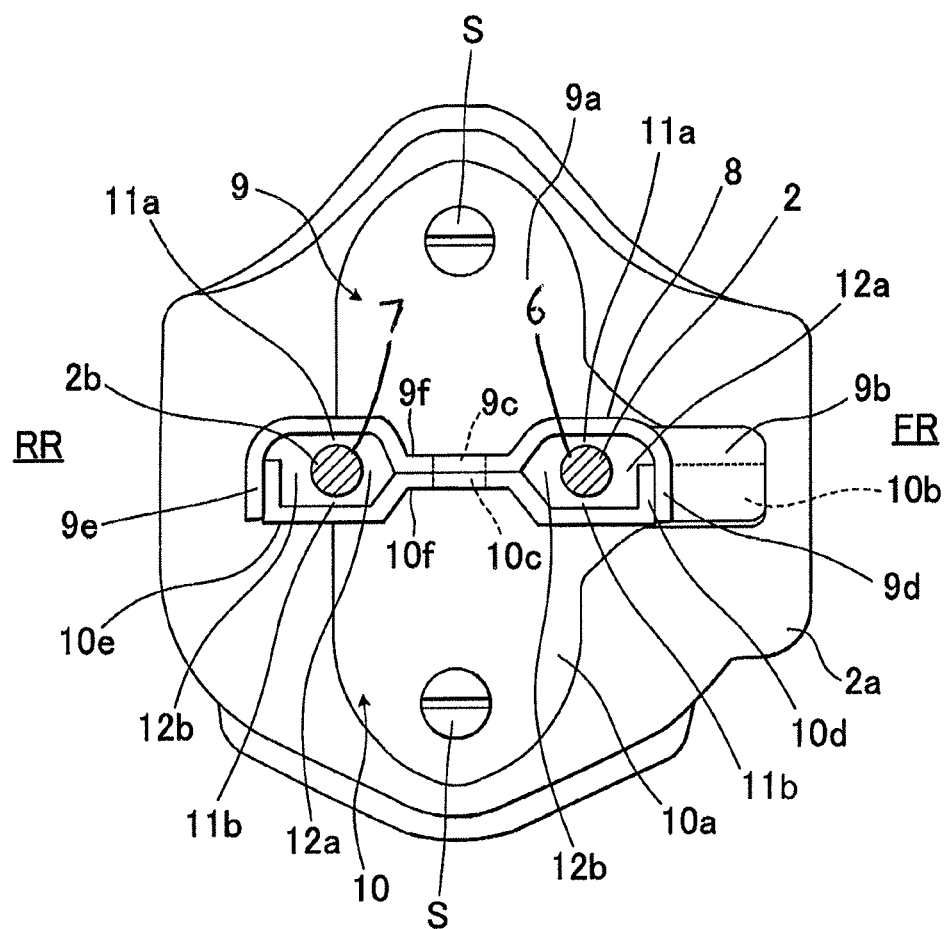
FIG. 4 is a sectional view taken along the line IV-IV in the FIG. 3.

As shown in FIGS. 3 and 4, briefly stated, a reinforcing bracket 8 is provided, which surrounds a foot area of the striker's loop portion 2b (including the free end portions 2c and 2c thereof fixed to the securing base member 2a) in such a manner that space areas 11a, 11b, 12a and 12b are given between the reinforcing bracket 8 and that foot area of the striker's loop portion 2b.

In this context, since the striker 2 extends horizontally from the vertical surface of the vehicle wall B in the shown embodiment, it is to be understood that the loop portion 2b of the striker 2 has an upper side facing in a direction upwardly of the vehicle or seat back SB and also has a lower side facing in a direction downwardly of the latter SB, as far as the shown embodiment is concerned.

Based on such understanding, the reinforcing bracket 8 comprises: a first bracket member 9 to be situated on the upper side of the loop portion 2*b*; and a second bracket member 10 to be situated on the lower side of the loop portion 2*b*.

Specifically, the first bracket member 9 is so formed to have a main body portion having a substantially "M" shaped cross-section as viewed from FIG. 4, which includes a center region 9*f*, a first lateral region 9*d* (facing towards the forward side FR in the shown embodiment), and a second lateral region 9*e* (facing towards the rearward side FR in the shown embodiment), in such a manner that one upwardly protruding region is defined between the first lateral region 9*d* and the center region 9*f*, whereas on the other hand, another upwardly protruding region is defined between the second lateral region 9*e* and the center region 9*f*, although no designation is given thereto in the Figures. Such two upwardly protruding regions, each having a substantially inverted-U-shaped cross-section, serve to substantially define space areas 11*a*, 12*a* and 12*b* inwardly thereof with respect to the front and rear rectilinear regions 6 and 7 of the striker's loop portion 2*b*, respectively, as will be elaborated later. Further, the first bracket member 9 includes a securing leg portion 9*a* and a protuberant portion 9*b*, which are both formed integrally in the foot area of the first bracket member 9. The securing leg portion 9*a* extends outwardly from one planar side of the first bracket member 9 where the center region 9*f* lies, while on the other hand, the protuberant portion 9*b* extends outwardly from one lateral side of the first bracket member 9 where the first lateral region 9*d* lies.

Designation 9*c* denote a welding access hole which is formed substantially centrally in the center region 9*f* of the first bracket member 9.

The second bracket member 10 is so formed to have a main body portion having a substantially "W" shaped cross-section as viewed from FIG. 4. This second bracket member 10 includes: a center region 10*f*; a first lateral region 10*d* (facing towards the forward side FR in the shown embodiment; and a second lateral region 10*e* (facing towards the rearward side FR in the shown embodiment), in such a manner that one downwardly protruding region is defined between the first lateral region 10*d* and the center region 10*f*, whereas another downwardly protruding region is defined between the second lateral region 10*e* and the center region 10*f*, although no designation is given thereto in the Figures. Such two downwardly protruding regions, each having a substantially-U-shaped cross-section, serve to substantially define space areas 11*b*, 12*a* and 12*b* inwardly thereof with respect to the front and rear rectilinear regions 6 and 7 of the striker's loop portion 2*b*, respectively, as will be elaborated later. Further, the second bracket member 10 includes a securing leg portion 10*a* and a protuberant portion 10*b*, which are both formed integrally in the foot area of the second bracket member 10. The securing leg portion 10*a* extends outwardly from one planar side of the second bracket member 10 where the center region 10*f* lies, while on the other hand, the protuberant portion 10*b* extends outwardly from one lateral side of the second bracket member 9 where the first lateral region 10*d* lies.

Designation 10*c* denote a welding access hole which is formed substantially centrally in the central region 10*f* of the second bracket member 10.

In assembly, since the loop portion 2*b* of the striker 2 extends horizontally from or perpendicular to the vertical vehicle wall B, at first, the first bracket member 9 is brought to the upper side of the loop portion 2*b*, while the second bracket member 10 is brought to the lower side of the same 2*b*, so that, roughly stated, those two bracket members 9 and 10 are mated with each other, with the striker's loop portion 2*b* being interposed therebetween. At this point, two outer surfaces respective of the first and second lateral regions 10*d* and 10*e* of the second bracket member 10 are juxtaposed and contacted with two inward surfaces respective of the first and second lateral regions 9*d* and 9*e* of the first bracket member 9, as seen in FIGS. 3 and 4. Also, the center region 9*f* of the first bracket member 9 is juxtaposed and contacted with the center region 10*f* of the second bracket member 10, with the welding access hole 9*c* of the former 9 being aligned with the welding access hole 10*c* of the latter 10. Subsequently, welding is effected to and along: a connection line between the two first lateral regions 9*e* and 10*e*; a connection line between the two second lateral regions 9*d* and 10*d*; and a connection line between the two protuberant potions 9*b* and 10*b*, wherein those connection lines can be recognized from FIGS. 3 and 4. Further, welding is effected, via the aligned welding access holes 9*c* and 10*c*, to and along a connection line between the two center regions 9*f* and 10*f* therein, wherein such connection line is defined in and along the inner edges of the aligned welding access holes 9*c* and 10*c*, as can be seen in FIG. 3. With those welding operations, the first and second bracket members 9 and 10 are firmly connected with each other, so that the reinforcing bracket 8 is formed.

In this regard, as mentioned earlier, it should be understood again that the first bracket member 9 has one upwardly protruding region defined on one lateral end side thereof (on the left in FIG. 4) and another upwardly protruding region defined on the other lateral end side thereof (on the right in FIG. 4), whereas on the other hand, the second bracket member 10 has one downwardly protruding region defined on one lateral end side thereof (on the left in FIG. 4) and another downwardly protruding region on the other lateral end side thereof (on the right in FIG. 4). Hence, in the resulting reinforcing bracket 8, the afore-said one upwardly protruding region of the first bracket member 9 is mated with the afore-said one downwardly protruding region of the second bracket member 10. The thus-mated two protruding regions cooperate with each other to define a first substantially-cylindrical portion in the forwardly-facing lateral end portion of the reinforcing bracket 8 (on the right in FIG. 4), wherein such first substantially-cylindrical portion has an laterally elongated annular cross-section. Likewise, on the other hand, the afore-said another upwardly protruding region of the first bracket member 9 is mated with the afore-said another downwardly protruding region of the second bracket member 10. The thus-mated two protruding regions cooperate with other to define a second substantially-cylindrical portion in the rearwardly-facing lateral end portion of the reinforcing bracket 8 (on the left in FIG. 4), wherein such second substantially-cylindrical portion also has an laterally elongated annular cross-section.

Accordingly, as best seen in FIG. 4, the front rectilinear region 6 of the striker's loop portion 2*b* is situated within and surrounded by the aforementioned first substantially-cylindrical portion of the reinforcing bracket 8, whereupon an upper space area 11*a*, a lower space area 11*b*, a front space area 12*a*, and a rear space area 12*b* are given in that first substantially-cylindrical portion in relation to the front rectilinear region 6. Likewise, the rear rectilinear region 7 of the striker's loop portion 2*b* is situated within and surrounded by the aforementioned second substantially-cylindrical portion of the reinforcing bracket 8, whereupon an upper space area 11*a*, a lower space area 11*b*, a front space area 12*a*, and a rear space area 12*b* are given in that second substantially-cylindrical portion in relation to the rear rectilinear region 7. In the present invention, each of those first and second substantially-cylindrical portions is formed long laterally, thus being elongated in the forward and rearward directions, while being formed short vertically, thus being shortened in the upward and downward directions. Therefore, the front and rear space areas 12*a* and 12*b* are wide with respect to the corresponding rectilinear region (6 or 7) of the loop portion 2*b*, while on the other hand, the upper and lower space areas 11*a* and 11*b* are narrow with respect to the corresponding rectilinear region (6 or 7) of the loop portion 2*b*. Namely, the former space areas 12*a* and 12*b* are larger than the latter space areas 11*a* and 11*b*.

In summary, it can be stated generically that, with regard to the front rectilinear region 6, the upper and lower space areas 11*a* and 11*b* are substantially defined on first opposite sides of that front rectilinear region 6, such that both upper and lower space areas 11*a* and 11*b* expand or open in a vertical direction that intersects both front rectilinear region 6 and latch 3*a* in upward and downward directions, whereas on the other hand, the front and rear space areas 12*a* and 12*b* are substantially defined on second opposite sides of the front rectilinear region 6, such that both front and rear space areas space areas 12*a* and 12*b* expand or open in a horizontal direction orthogonal to the vertical direction of the upper and lower space areas 11*a* and 11*b*, and also expand or open along the forward-and-rearward direction in which the latch 3*a* extends.

Likewise, with regard to the rear rectilinear region 7, it can be stated that all the upper, lower, front and rear space areas 11*a*, 11*b*, 12*a* and 12*b* surrounding the same 7 are arranged in substantially the same manner as described above.

Designation 2*h* denotes a first securing hole formed in the securing base member 2*a*, and designation 10*h* denotes a second securing hole formed in the securing leg portion 10*a*. While not clearly shown, by looking at FIGS. 3 and 4, it is to be understood that a pair of the first securing holes 2*h* are formed in the securing base member 2*a*, and that a pair of the second securing holes (not shown) are also formed in the two securing leg portion 10*a* and 10*b*, respectively. Hence, as understandable from FIG. 4, a pair of securing screws S and S pass through a pair of first and second aligned securing holes (as at 2*h* and 10*h*), respectively, so that the reinforcing bracket 8 is thereby fixedly secured to the securing base member 2*a* of the striker 2.

With the above-described arrangement of striker 2 and reinforcing bracket 8, when the latch 3*a* of the lock element 3 is engaged with the front rectilinear region 6 of the striker 2, it is to be appreciated that:

a) Suppose that a relatively low load is caused at the seat back SB and applied via the latch 3*a* to the loop portion 2*b* of the striker 2. In this instance, let us define that the "relatively low load" is of such a low degree of load that will at the most cause deformation (or bending) of the loop portion 2*b* within the afore-said space areas 11*a*, 11*b*, 12*a* and 12*b* of the reinforcing bracket 8, insofar as the deformed (or bent) loop portion 2*b* does not reach the reinforcing bracket 8. Namely, suppose that, upon such relatively low load being applied to the striker 2 via the latch 3*a*, the loop portion 2*b* is deformed toward the reinforcing bracket 8. In that case, the space areas 11*a*, 11*b*, 12*a* and 12*b* in each of the above-described first and second substantially-cylindrical portions of the reinforcing bracket 8 permit and absorb deformation (or bending) of the loop portion 2*b* therewithin. In other words, the loop portion 2*b* of the striker 2 is deformed or bent only within such space areas, without being contacted with the reinforcing bracket 8. This means that the relatively low load is dispersed and reduced in the striker's loop portion 2*b* only, without being imparted to the reinforcing bracket 8. The thus-reduced load is directly transmitted from the loop portion 2*b* to the securing base member 2*a* and dispersed therein, thereby being further reduced at that securing base member 2*a*. At this moment, a certain great stress is caused in the securing base member 2*a*, and therefore it is possible that the securing base member 2*a* will be pulled and deformed outwardly from the vehicle wall B even by the reduced load, which may result in the vehicle wall B being pulled and deformed outwardly with that securing base member 2*a*. However, the securing base member 2*a* is firmly attached to the vertically-extending two securing leg portions 9*a* and 10*a* at two points and also firmly attached to the horizontally-extending juxtaposed protuberant portions 9*b* and 10*b* at one point, which means that the securing base member 2*a* itself is reinforced by the bracket 8 at the three points. As such, the load being exerted on the securing base member 2*a* is widely distributed and absorbed into those horizontally and vertically extending portions (9*a*, 9*b*, 10*a* and 10*b*) of the reinforcing bracket 8 and eventually reduced to a very low degree that does not cause any damage to the vehicle wall B. In other words, an impact energy of the load that is imparted via the striker 2 to the vehicle wall B is reduced to such a small degree that does not cause any damage to the vehicle wall B. Thus, deformation and breakage of the vehicle wall B or vehicle body side can be prevented with much reliability. This arrangement of striker and reinforcing bracket is suitable for effective use on a relatively weak or low rigid wall of vehicle, in particular.

In this context, according to the shown embodiment, the front and rear space areas 12*a* and 12*b* are lager than the upper and lower space areas 11*a* and 12*b*, respectively. This arrangement is particularly effective in absorbing a load that will be applied via the latch 3*a* in either of forward and rearward directions to the striker's loop portion 2*b* that extends orthogonally to that load. More specifically, upon a relatively small load being applied to the striker 2 via the latch 3*a* in either of forward and rearward directions, one or both of the front and rear rectilinear regions 6 and 7 of the striker's loop portion 2*b* is deformed towards either of the front and rear sides of the reinforcing bracket 8. But, the front and rear space areas 12*a* and 12*b* in each of the afore-said first and second substantially-cylindrical portions of the reinforcing bracket 8 permit and absorb forward and rearward deformation or bending of either or both of the front and rear rectilinear regions 6 and 7 therewithin. Thus, in that case, either or both of the front and rear rectilinear regions 6 and 7 is/are deformed (or bent) only within the corresponding front and rear space areas 12*a* and 12*b*, without being contacted with the reinforcing bracket 8. Accordingly, the relatively low load is dispersed and reduced in the striker's loop portion 2*b* only, without being imparted to the reinforcing bracket 8. The thus-reduced load is directly transmitted from the loop portion 2*b* to the securing base member 2*a* and dispersed therein, thereby being further reduced at that securing base member 2*a*. Furthermore, at this moment, the load being exerted on the securing base member 2*a* is widely distributed and absorbed into the vertically and horizontally protruding portions (9*a*, 9*b*, 10*a* and 10*b*) of the reinforcing bracket 8 and eventually reduced to an extremely low degree that does not cause any damage to the vehicle wall B.

b) The reinforcing bracket 8 has: the juxtaposed two protuberant portions 9*b* and 10*b* which are firmly welded with each other; and the juxtaposed two first lateral regions 9*d* and 10*d* which are also firmly welded with each other, as stated previously. Further, the reinforcing bracket 8 has the juxtaposed two second lateral regions 9*e* and 10*e* which are firmly welded with each other, and also has the juxtaposed center regions 9*f* and 10*f* which are firmly welded with each other, as well. Owing to such juxtaposed and welded portions, a whole of the reinforcing bracket 8 is provided with a high strength sufficient to withstand a great load applied thereto in any direction from the loop portion 2*b* of the striker 2.

In this context, as far as the shown embodiment is concerned, suppose that a great load is applied to the loop portion 2*b* of the striker 2 in either of forward and rearward directions and that the loop portion 2*b* is thereby deformed and struck against the reinforcing bracket 8. In that case, the juxtaposed and welded protuberant portions 9*b* and 10*b* as well as the juxtaposed and welded first lateral regions 9*d* and 10*d*, of the reinforcing bracket 8, serve as a first robust reinforcing area on the front side (at FR) toward which a great load is to be directly applied in either of forward and rearward directions from the striker's loop portion 2*b*, Also, the juxtaposed and welded second lateral regions 9*e* and 10*e* of the reinforcing bracket 8 serve as a second robust reinforcing area on the rear side (at RR) toward which the afore-said great load is to be applied in either of forward and rearward directions. Additionally, the juxtaposed and welded center regions 9*f* and 10*f* of the reinforcing bracket 8 serve as a central reinforcing area extending rectilinearly between the above-defined first and second robust reinforcing areas, which extends along a forward-and-rearward direction in which the latch 3*a* extends. This central reinforcing area is aligned with a line along which the front and rear rectilinear regions 6 and 7 of the striker's loop portion 2*b* lies abreast of each other, as seen in FIG. 4. In other words, such central reinforcing area (i.e. the juxtaposed and welded center regions 9*f* and 10*f*) has: one robust lateral end to which the rearward great load is to be directly applied from the front rectilinear portion 6 via the latch 3*a*; and the other robust lateral end to which the forward great load is to be directly applied from the rear rectilinear portion 7 via the latch 3*a*. By being so formed, the reinforcing bracket 8 particularly has a high strength for withstanding a great load applied thereto in either of forward and rearward directions from the loop portion 2*b* of the striker 2.

c) Now, suppose that a great load is caused at the seat back SB and applied via the latch 3*a* to the loop portion 2*b* of the striker 2. In this instance, the "great load" is defined hereby to be a great load exceeding the above-defined relatively small load, which produces a great impact energy that causes excessive deformation (or bending) of the loop portion 2*b*, to the extent that the loop portion 2*b* is deformed over (or moved past) either or both of the front and rear space areas 12*a* and 12*b* and eventually struck against the reinforcing bracket 8. Upon such great load being applied toward the striker 2 via the latch 3*a*, the loop portion 2*b* of the striker 2 is deformed towards the reinforcing bracket 8. But, at first, the space areas 11*a*, 11*b*, 12*a* and 12*b* serve to give a certain time during which the loop portion 2*b* is deformed and displaced within those space areas. During such time, the great load is dispersed in an entirety of the loop portion 2, with a certain amount of the great load being quickly transmitted through the loop portion 2 to the vehicle wall B. In other words, an impact energy of the great load is absorbed by an amount corresponding to a time during which the loop portion 2*b* is deformed within the space areas 11*a*, 11*a*, 12*a* and 12*b* until the same 2*b* contacts the reinforcing bracket 8. This means that a certain time lag is given before the deformed loop portion 2*b* contacts the reinforcing bracket 8. As such, at this first stage, the great load is reduced to a certain degree preliminarily. Thereafter, the loop portion 2*b* is struck against the reinforcing bracket 8, at which time, so preliminarily reduced great load is widely distributed and absorbed into the two securing leg portions 9*a* and 10*a* of the reinforcing bracket 8 as well as in the juxtaposed protuberant portions 9*b* and 10*b* of the reinforcing bracket 8. As a result thereof, the great load that has been reduced in the afore-said time lag is further reduced at this second stage, and finally, so progressively or twice reduced load is transmitted via the securing base member 2*a* to the vehicle wall B. It is therefore appreciated that the great load becomes smaller stepwise from the first stage to the second stage, so that a whole impact energy of the great load is assuredly reduced to an extremely small degree that does not cause any damage to the vehicle wall B. This remarkable load reduction is achieved by provision of the space areas 11*a*, 11*b*, 12*a* and 12*b* between the striker's loop portion 2*b* and the reinforcing bracket 8, in contrast to the previously-stated conventional arrangement wherein both striker and reinforcing bracket are integrally connected with each other.

In this context, as far as the shown embodiment is concerned, suppose that a great load is applied to the striker 2 in either of forward and rearward directions via the latch 3*a*. In that instance, one or both of the front and rear rectilinear regions 6 and 7 of the striker's loop portion 2*b* is/are deformed towards either of the front and rear sides of the reinforcing bracket 8. Hereinafter, for the sake of simplicity, referring to FIGS. 3 and 4, a description will only be made of the instance where both front and rear rectilinear regions 6 and 7 are deformed (or bent) towards the reinforcing bracket 8 in the rearward direction by a rearwardly applied great load that is indicated by the arrow RR in FIG. 3. In this case, at a first stage, the front rectilinear region 6 is deformed (or bent) within the rear space area 12*b* given in the first substantially-cylindrical portion of the reinforcing bracket 8 in a direction to one lateral end (on the right in FIG. 4) of the juxtaposed center regions 9*f* and 10*f* of the reinforcing bracket 8. Concurrently, the rear rectilinear region 7 is also deformed (or bent) within the rear space area 12*b* given in the second substantially-cylindrical portion of the reinforcing bracket 8 in a direction to the juxtaposed two second lateral regions 9*e* and 10*e* of the reinforcing bracket 8 (on the left in FIG. 4). At this first stage, the rear space area 12*b* in the first substantially-cylindrical portion (on the right in FIG. 4) serves to give a time during which the front rectilinear region 6 is deformed and displaced within that rear space area 12*b*, while on the other hand, the rear space area 12*b* in the second substantially-cylindrical portion (on the left in FIG. 4) serves to give a time during which the rear rectilinear region 7 is deformed and displaced within the rear space area 12*b*. During such time, the rearwardly applied great load is dispersed in an entirety of the loop portion 2*b*, with a certain amount of the great load being quickly transmitted through the two rectilinear regions 6 and 7 to the vehicle wall B. In other words, an impact energy of the great load is absorbed by an amount corresponding to a time during which the front and rear rectilinear regions 6 and 7 are deformed within the two rear space areas 12b and 12b, respectively, before contacting the side of the reinforcing bracket 8. This means that a certain time lag is given before the deformed front rectilinear region 6 contacts the aforesaid one lateral end of the juxtaposed center regions 9f and 10f, and also, a certain time lag is given before the deformed rear rectilinear region 7 contacts the juxtaposed two second lateral regions 9e and 10e. Thus, at this first stage, the great load is reduced to a certain degree preliminarily. Thereafter, the front rear rectilinear region 6 is struck against the afore-said one lateral end of the juxtaposed center regions 9f and 10f, while the rear rectilinear region 7 is struck against the juxtaposed two second lateral regions 9e and 10e. Here, as discussed in the item b) above, those juxtaposed center regions 9f and 10f and juxtaposed second lateral regions 9e and 10e provide a robust area having a high great strength for withstanding the forward or rearward great load which is directly applied thereto from the front and rear rectilinear regions 6 and 7, so that the reinforcing bracket 8 itself is not deformed by such great load. Accordingly, at this second stage, both front and rear rectilinear regions 6 and 7 are prevented by the robust reinforcing bracket 8 against further deformation, whereupon the great load is immediately imparted via those rectilinear regions 6 and 7 to the reinforcing bracket 8 and then widely distributed and absorbed into the two securing leg portions 9a and 10a of the reinforcing bracket 8 as well as in the juxtaposed protuberant portions 9b and 10b thereof. Consequently, the great load that has been reduced in the afore-said time lag is further reduced at this second stage, and finally, so progressively or twice reduced load is transmitted via the securing base member 2a to the vehicle wall B. It is therefore appreciated that the great load becomes smaller stepwise from the first stage to the second stage, so that a whole impact energy of the great load is assuredly reduced to an extremely low degree that does not cause any damage to the vehicle wall B. Further, it is appreciated that both front and rear rectilinear regions 6 and 7 of the striker's loop portion 2b are deformed or bent within the corresponding two rear space areas 12b and 12b, respectively, and thereafter prevented by the reinforcing bracket 8 against further deformation or bending, so that the deformation or bending of those two rectilinear regions 6 and 7 can be limited to a smallest possible extent.

While having described the present invention thus far, it should be understood that the invention is not limited to the illustrated embodiment, but any modification, replacement and addition may be applied thereto, without departing from the scope of the appended claims. For example, each of the first and second substantially-cylindrical portions of the reinforcing bracket 8 may be so formed as to become larger or divergent in a direction from the base portion of the striker's loop portion 2b to the free end portion thereof, such that all the space areas 11a, 11b, 12a and 12b in each of the first and second substantially-cylindrical portions of the reinforcing bracket 8 become wider in that direction with respect to the corresponding one of the front and rear rectilinear regions 6 and 7. In other words, as far as the shown embodiment is concerned, those space areas 11a, 11b, 12a and 12b become wider in a direction from the vehicle wall B or vehicle body side to a side where the seat back B lies. In such mode, deformation or bending of the front and rear rectilinear regions 6 and 7 in those divergent space areas will be increased more than in the shown space areas 11a, 11b, 12a and 12b, thereby prolonging the afore-said time lag to increase reduction of the relatively small load or the great load at the first stage.

What is claimed is:

1. A striker configured to interact with a lock element provided in a vehicle, the striker comprising:
    an engagement portion positioned and configured to engage with said lock element; and
    a reinforcing bracket disposed with respect to said engagement portion such that a predetermined space is provided between said reinforcing bracket and said engagement portion,
    wherein, when said lock element is engaged with said engagement portion of the striker and when a load is applied via said lock element to said engagement portion by an excessive great degree, causing deformation and displacement of said engagement portion over said predetermined space, said engagement portion comes to contact with said reinforcing bracket, thereby limiting the displacement of said engagement portion,
    wherein said engagement portion is formed in a substantially rod shape so as to extend in a first direction that intersects a second direction in which said lock element extends, when the lock element is engaged with the engagement portion, and
    wherein said predetermined space has a longitudinal extent in a direction along said second direction of said lock element in relation to said engagement portion,
    wherein said engagement portion is formed in a substantially rod shape so as to extend in a direction that intersects said lock element, when the lock element is engaged with the engagement portion,
    wherein said predetermined space includes:
    a pair of first and second space areas substantially defined on first opposite sides of said engagement portion, such that both said pair of first and second space areas open in a first direction that intersects said engagement portion and said lock element engaged with the engagement portion; and
    a pair of third and fourth space areas substantially defined on second opposite sides of said engagement portion, such that both said pair of third and fourth space areas open in a second direction that intersects said first direction of said pair of first and second space areas and also open along a direction in which said lock element extends.

2. The striker according to claim 1, wherein said pair of third and fourth space areas are each elongated in said second direction thereof in relation to said engagement portion of said striker.

3. The striker according to claim 1, wherein said pair of first and second space areas are smaller than said pair of third and fourth space areas, respectively.

4. The striker as claimed in claim 1, wherein said engagement portion comprises a first side portion and a second side portion, the first and second side portions each received in the reinforcing bracket when the lock element is engaged with the engagement portion, the predetermined space including a first space adjacent the first side portion and a second space adjacent the second side portion.

5. A striker configured to interact with a lock element provided in a vehicle, the striker comprising:
    an engagement portion positioned and configured to engage with said lock element; and a reinforcing bracket disposed with respect to said engagement portion such that a predetermined space is provided between said reinforcing bracket and said engagement portion, wherein, when said lock element is engaged with said engagement portion of the striker and when a load is applied via said lock element to said engagement portion by an excessive great degree, causing deformation and displacement of said engagement portion over said predetermined space, said engagement portion comes to contact with said reinforcing bracket, thereby limiting the displacement of said engagement portion, wherein said engagement portion is formed in a substantially rod shape so as to extend in a first direction that intersects a second direction in which said lock element extends, when the lock element is engaged with the engagement portion, and wherein said predetermined space has a longitudinal extent in a direction along said second direction of said lock element in relation to said engagement portion, wherein said striker is so formed from a rod material as to have a loop portion of substantially "U" shape, said loop portion including a first substantially-rectilinear region and a second substantially-rectilinear region, such that said first and second substantially-rectilinear regions extend in a substantially parallel relation with each other and also extend in a first direction that intersects a second direction in which said lock element extends, when the lock element is engaged with said engagement portion, wherein said engagement portion is said first substantially-rectilinear regions of said loop portion, wherein said predetermined space comprises: a first space provided so as to surround said first substantially-rectilinear region of said loop portion; and a second space provided so as to surround said second substantially-rectilinear region of said loop portion, wherein said first space includes:

a pair of first and second space areas substantially defined on first opposite sides of said first substantially-rectilinear region, such that both said pair of first and second space areas open in a first direction that intersects said first substantially-rectilinear region and said lock element engaged with said first substantially-rectilinear region; and a pair of third and fourth space areas substantially defined on second opposite sides of said first substantially-rectilinear region, such that both said pair of third and fourth space areas open in a second direction that intersects said first direction of said pair of first and second space areas and also open along a direction in which said lock element extends, and wherein said second space includes:

a pair of first and second space areas substantially defined on first opposite sides of said second substantially-rectilinear region, such that both said pair of first and second space areas open in a first direction that intersects said second substantially-rectilinear region; and a pair of third and fourth space areas substantially defined on second opposite sides of said second substantially-rectilinear region, such that both said pair of third and fourth space areas open in a second direction that intersects said first direction of said pair of first and second space areas and also open along the direction in which said lock element extends.

6. The striker according to claim 5, wherein said pair of third and fourth space areas in said first space are each elongated in said second direction in relation to said first substantially-rectilinear region of said striker, and wherein said pair of third and fourth space areas in said second space are each elongated in said second direction in relation to said second substantially-rectilinear region of said striker.

7. The striker according to claim 5, wherein, in said first space, said pair of first and second space areas are smaller than said pair of third and fourth space areas, respectively, and wherein, in said second space, said pair of first and second space areas are smaller than said pair of third and fourth space areas, respectively.

8. The striker as claimed in claim 5, wherein said engagement portion comprises a first side portion and a second side portion, the first and second side portions each received in the reinforcing bracket when the lock element is engaged with the engagement portion, the predetermined space including a first space adjacent the first side portion and a second space adjacent the second side portion.

* * * * *